US011939803B2

(12) United States Patent
Russo, Jr.

(10) Patent No.: US 11,939,803 B2
(45) Date of Patent: Mar. 26, 2024

(54) TRUE 270-DEGREE HINGE ASSEMBLY

(71) Applicant: Joseph Thomas Russo, Jr., Hudson, MA (US)

(72) Inventor: Joseph Thomas Russo, Jr., Hudson, MA (US)

( * ) Notice: Subject to any disclaimer, the term of this patent is extended or adjusted under 35 U.S.C. 154(b) by 271 days.

(21) Appl. No.: 17/445,217

(22) Filed: Aug. 17, 2021

(65) Prior Publication Data

US 2023/0055099 A1 Feb. 23, 2023

(51) Int. Cl.

*E05D 11/06* (2006.01)
*E05D 3/18* (2006.01)
*E05D 5/02* (2006.01)

(52) U.S. Cl.

CPC ................ *E05D 3/18* (2013.01); *E05D 5/02* (2013.01); *E05D 11/06* (2013.01); *E05Y 2900/606* (2013.01)

(58) Field of Classification Search

CPC .......... E05D 7/04; E05D 7/06; E05D 7/0407; E05D 7/0415; E05D 7/009; E05D 3/18; E05D 3/186; E05D 3/06; E05D 3/122; E05D 3/12; E05D 3/14; E05D 3/16; E05D 2003/163; E05D 11/06; E05D 5/02; E05D 5/0276; E05Y 2201/618; E05Y 2201/62; E05Y 2201/71; E05Y 2201/716; E05Y 2201/712; E05Y 2900/606; E05Y 2900/20; E05Y 2900/502; E05Y 2201/638; E05F 3/20; E05F 5/006

See application file for complete search history.

(56) References Cited

U.S. PATENT DOCUMENTS

| | | | | |
|---|---|---|---|---|
| 1,352,379 A * | 9/1920 | Pounder | E05D 3/02 16/361 |
| 2,073,689 A * | 3/1937 | Gotzinger | E05D 3/18 16/358 |
| 2,648,870 A * | 8/1953 | Wilhelmi | E05D 5/065 16/390 |
| 3,008,178 A * | 11/1961 | Hofgesang | A47B 29/00 16/287 |
| 4,854,010 A * | 8/1989 | Maraghe | E05D 3/18 49/248 |
| 4,928,350 A | 5/1990 | Morgan | |
| 5,493,760 A | 2/1996 | Takimoto | |
| 5,943,739 A | 8/1999 | Vandergriff | |
| 6,564,428 B2 | 5/2003 | Richard et al. | |

(Continued)

FOREIGN PATENT DOCUMENTS

| | | | |
|---|---|---|---|
| CN | 101440677 A * | 5/2009 | |
| DE | 2526433 A * | 12/1976 | E05D 11/1021 |

(Continued)

*Primary Examiner* — Chuck Y Mah

(74) *Attorney, Agent, or Firm* — Dunlap Bennett & Ludwig, PLLC

(57) ABSTRACT

A butt mounting hinge capable of movement through at least a 270-degree range of motion. The hinge assembly has two base elements and three connection elements defining a total of five hinge connections. The base elements are butt mounting elements. Each base element provides two pair of hinge connections, while the fifth hinge connection rides in a slidable void provided by an intermediate connection element interconnecting the other two connection elements.

8 Claims, 8 Drawing Sheets

(56) References Cited

U.S. PATENT DOCUMENTS

| | | | | |
|---|---|---|---|---|
| 7,350,273 | B1 * | 4/2008 | Skipper | E05D 3/16 16/369 |
| 7,574,775 | B2 * | 8/2009 | Zetti | E05F 1/1253 16/370 |
| 8,064,970 | B2 * | 11/2011 | Gaddy | H04M 1/022 455/575.8 |
| 8,434,197 | B2 * | 5/2013 | Oshima | E05D 3/186 16/241 |
| 10,253,804 | B2 | 4/2019 | Park et al. | |
| 10,474,203 | B2 | 11/2019 | Tazbaz et al. | |
| 10,480,226 | B1 | 11/2019 | Chen et al. | |
| 2005/0127712 | A1 | 6/2005 | Castillo | |
| 2008/0289146 | A1 * | 11/2008 | Chen | E05D 3/186 16/372 |
| 2009/0241288 | A1 * | 10/2009 | Zetti | E05D 11/1064 16/236 |
| 2012/0206893 | A1 | 8/2012 | Bohn et al. | |
| 2015/0267452 | A1 * | 9/2015 | Zetti | E05F 3/20 16/50 |
| 2017/0138103 | A1 * | 5/2017 | Hong | E05D 3/18 |
| 2017/0218671 | A1 * | 8/2017 | Frank | E05D 7/06 |
| 2017/0254127 | A1 * | 9/2017 | Uchiyama | F16C 11/04 |
| 2018/0230726 | A1 * | 8/2018 | Chen | E05D 11/10 |
| 2020/0255116 | A1 * | 8/2020 | Chadwell | E05D 3/12 |
| 2021/0207414 | A1 * | 7/2021 | Wong | E05D 3/186 |
| 2021/0332624 | A1 * | 10/2021 | Means | E05D 7/009 |

FOREIGN PATENT DOCUMENTS

| | | | |
|---|---|---|---|
| GB | 155628 | A * | 12/1920 |
| JP | 2501675 | B2 * | 3/1996 |

* cited by examiner

TRUE 270-DEGREE HINGE ASSEMBLY

BACKGROUND OF THE INVENTION

The present invention relates to hinge assemblies and, more particularly, a hinge assembly configured to provide a 270-degree range of motion from a butt mounted hinge.

Enclosures utilize hinges on covers or doors to provide access to the interior of the enclosure. Hinges often mount along the side of the enclosure so that the door does not close under its own weight. Most of the time, a hinge is designed for a 180-degree range of motion. However, in some instances, it may be advantageous to have a door that has approximately a 270-degree range of motion. Current 270-degree motion hinges, however, do not open doors fully to the entire 270 degrees, and do not mount like a butt hinge.

As can be seen, there is a need for a hinge assembly configured to provide a 270-degree range of motion from a butt mounted hinge, wherein the hinge assembly has a low-profile footprint with linkage built into it. Or in other words, the hinge assembly mounts like a butt hinge, but also provides a full 270-degree motion range.

The built-in linkage embodied in the present invention allows the top and bottom halves of hinge to work together. As the top half travels 180 degrees, the linkage works in tandem with the bottom half which travels 90 degrees, thus creating the full 270-degree range of motion. In sum, the present invention is a butt mounting hinge capable to travel 270-degrees, enabling different applications than current hinge assemblies, specifically butt mounting hinges.

SUMMARY OF THE INVENTION

In one aspect of the present invention, a hinge assembly includes the following: a first mounting plate; a second mounting plate; and a linkage interconnecting the first and second mounting plates so that the first and second mounting plates are pivotable relative to each other by at least 270-degrees.

In another aspect of the present invention, the hinge assembly may further include: the linkage comprising a first, a second, and a third connection element, respectively, wherein each connection element has a first end and a second end, and wherein the first end and the second end each have a pair of connection points; a slidable void extending between the first and the second ends of the second connection element; and the second end of the first connection element and the first end of the third connection element form a ridable hinge connection along said slidable void, wherein the first and second mounting plates are pivotable relative each other between a first state and a second state, wherein the first state, the first and second mounting plates are coplanar and wherein the second state, the first and second mounting plates are oriented at least 270-degrees relative to each other, wherein the first state the ridable hinge is at a first end of the slidable void, and wherein the second state the ridable hinge is at a second end of the slidable void; each mounting plate has a first and a second connecting portion, each connecting portion is pivotably connectable to one of a pair of connection elements; and the first connecting portion of the first mounting plate and the first end of the first connection element form a first hinge connection; the first connecting portion of the second mounting plate and the second end of the second connection element form a second hinge connection; the second connecting portion of the first mounting plate and the first end of the second connection element form a third hinge connection; the second connecting portion of the second mounting plate and the second end of the third connection element form a fourth hinge connection, the second end of the first connection element and the first end of the third connection element ride along the slidable voids of the second connection element to form a fifth hinge connection; wherein, between the first state and the second state, the first and third hinge connections rotate approximately 90-degrees and the second and fourth hinge connections rotate approximately 180-degrees, whereas the fifth hinge connection rides along the slidable voids; and wherein, for each mounting plate, the first and the second connecting portion are offset from each other in at least two directions.

These and other features, aspects and advantages of the present invention will become better understood with reference to the following drawings, description, and claims.

DETAILED DESCRIPTION OF THE INVENTION

Figure 1:
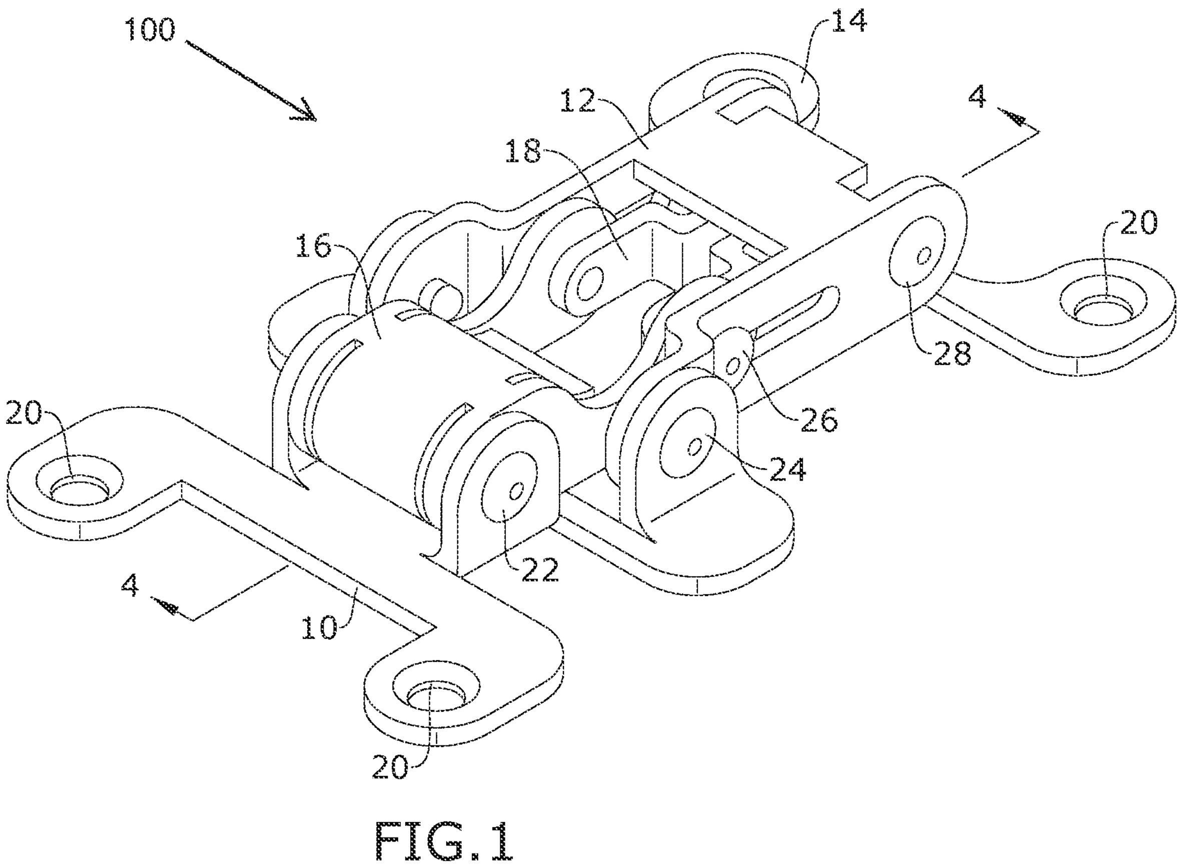
FIG. 1 is a perspective view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a butt mounting hinge capable of movement through at least a 270-degree range of motion. The hinge assembly has two base elements and three connection elements defining a total of five hinge connections. The base elements are butt mounting elements. Each base element provides two pair of hinge connections, while the fifth hinge connection rides in a slidable void provided by an intermediate connection element interconnecting the other two connection elements.

Referring now to FIGS. 1 through 20, the present invention may include a hinge assembly 100 comprising two base elements 10 and 14, and three connection elements 16/34, 12/32, and 18. The two base elements 10 and/or 14 may be butt mounting elements providing mounting holes 20.

The first base element 10 as well as the second base element 14 each has two pair of first and second connecting portions 102 and 103, respectively, extending upward therefrom. Connecting portions 102 and 103 may be located at an offset relative to each other along a first axis 501 and located at an offset relative to each other in a second axis 502, wherein the first and second directions 501 and 502 may be orthogonal to each other. Though, the first and second connecting portions 102 and 103, respectively, can be arranged symmetrically or asymmetrically with respect to the first and second directions 501 and 502. Each connecting portion may provide a pair of spaced apart connection points for forming hinged connections.

The first connection element 16/34 has a pair of connecting portions 161/341 at a first end and a pair of connecting portions 162/342 at a second end. The pairs of connection portions 161/341 and 162/342 may be coplanar relative to—i.e., not offset about—the second direction 502.

Figure 3:
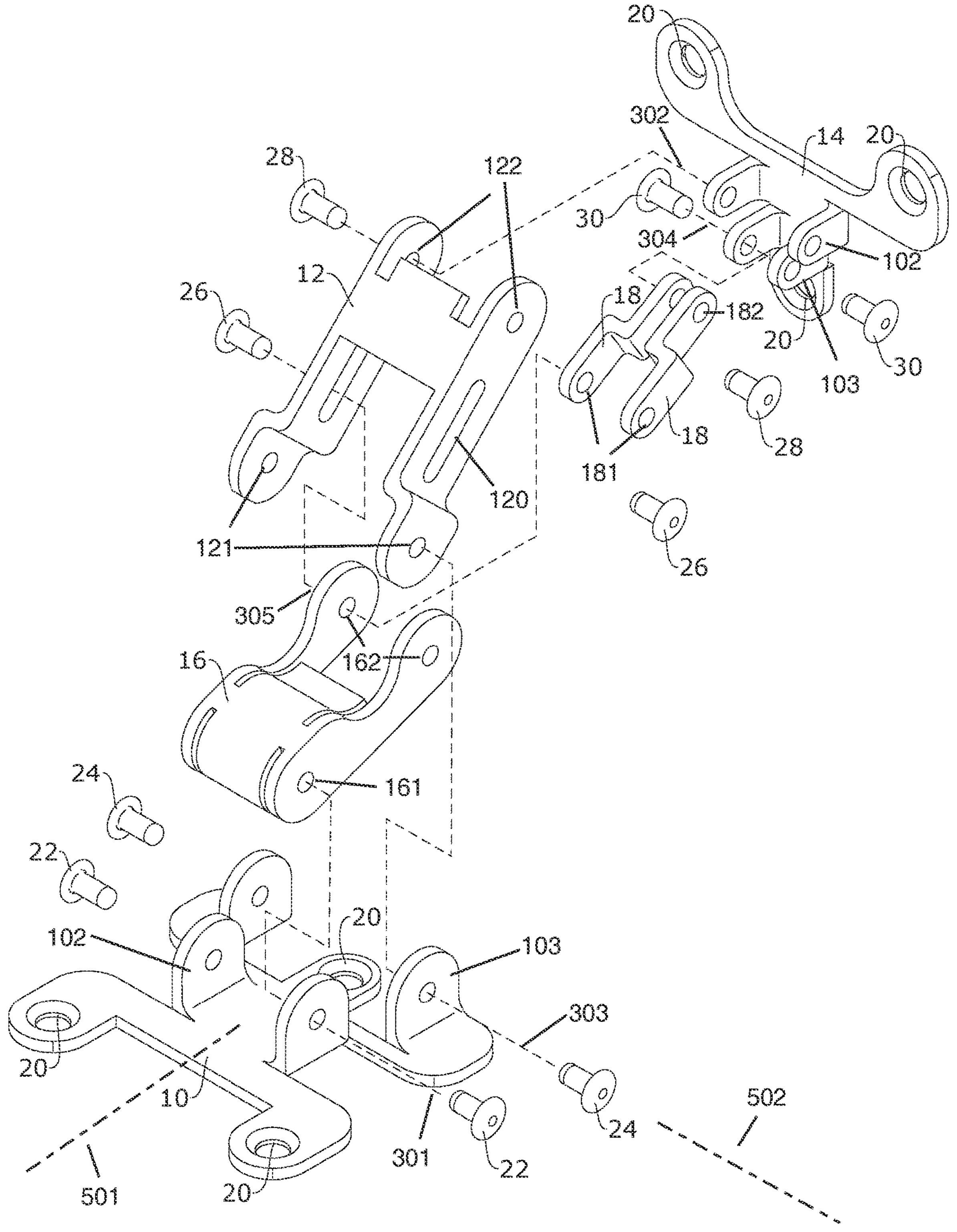
FIG. 3 is an exploded view of an exemplary embodiment of the present invention.
Figure 4:
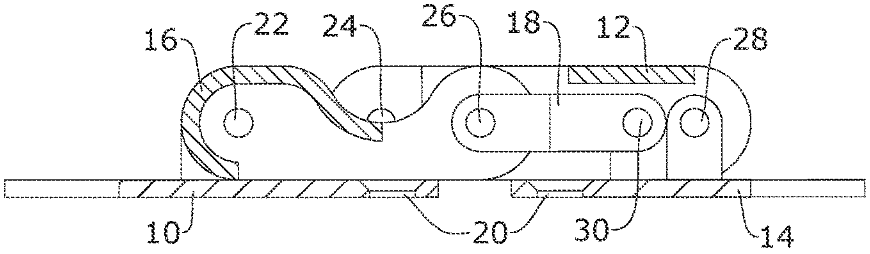
FIG. 4 is a section view of an exemplary embodiment of the present invention, taken along line 4-4 in FIG. 1.
Figure 5:
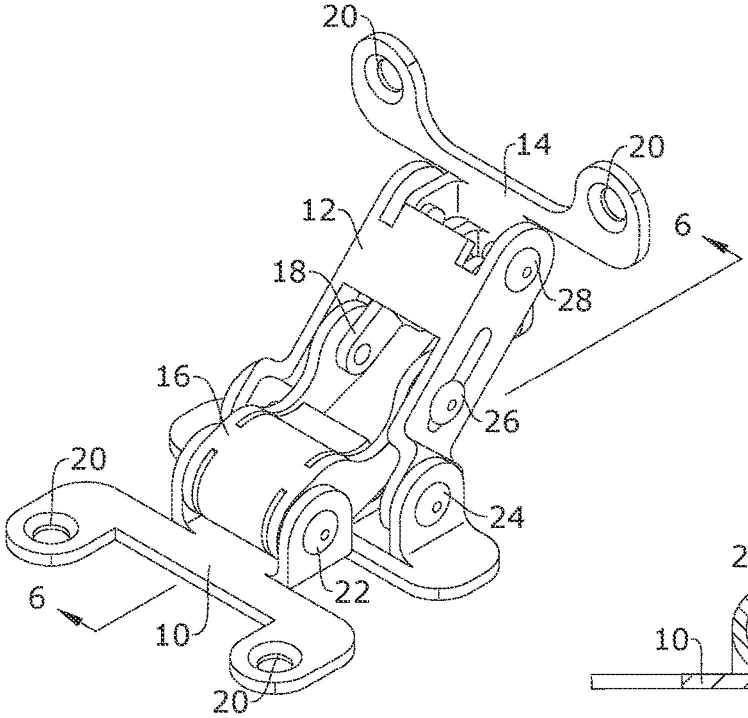
FIG. 5 is a perspective view of an exemplary embodiment of the present invention, showing the hinge at a 90-degree angle.
Figure 6:
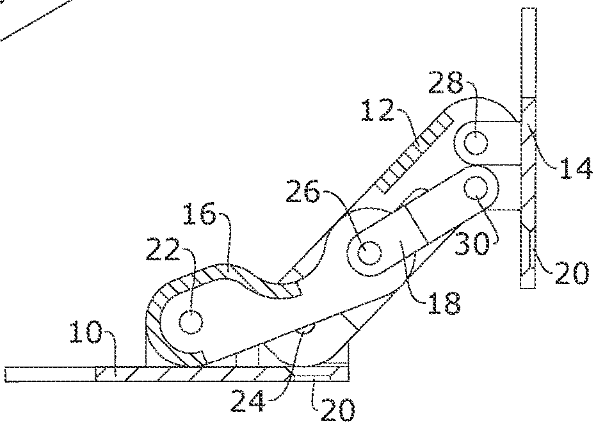
FIG. 6 is a section view of an exemplary embodiment of the present invention, taken along line 6-6 in FIG. 5.
Figure 7:
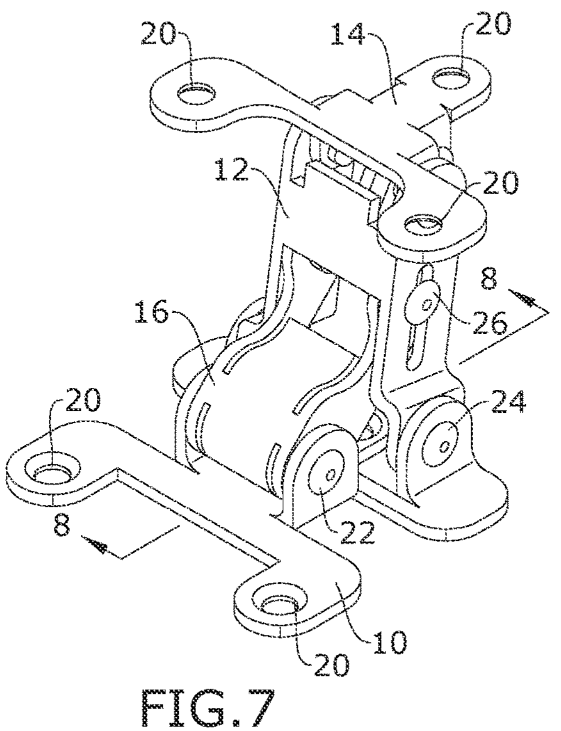
FIG. 7 is a perspective view of an exemplary embodiment of the present invention, showing the hinge at a 180-degree angle.
Figure 8:
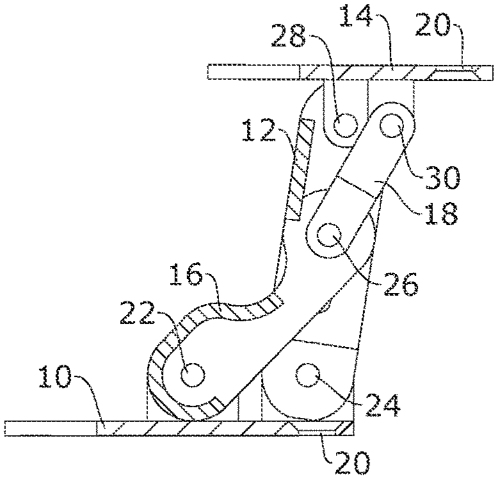
FIG. 8 is a section view of an exemplary embodiment of the present invention, taken along line 8-8 in FIG. 7.
Figure 9:
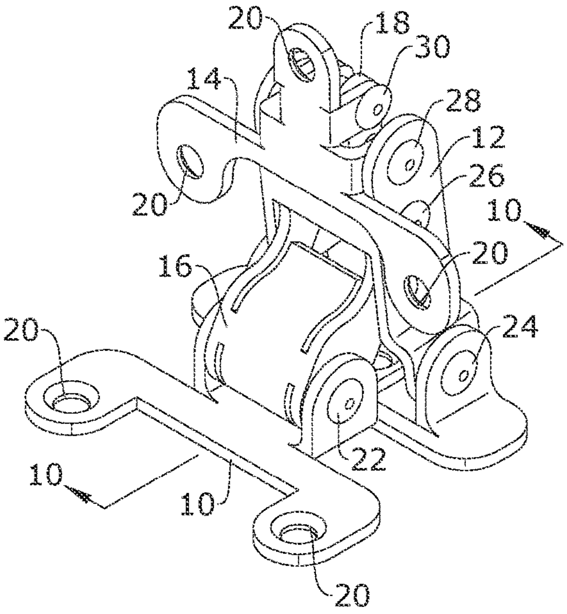
FIG. 9 is a perspective view of an exemplary embodiment of the present invention, showing the hinge at a 270-degree angle.
Figure 10:
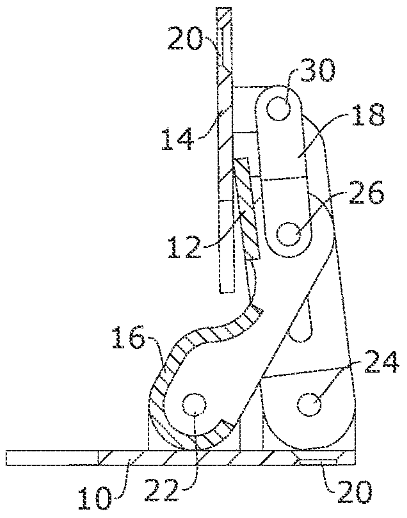
FIG. 10 is a section view of an exemplary embodiment of the present invention, taken along line 10-10 in FIG. 9.
Figure 11:
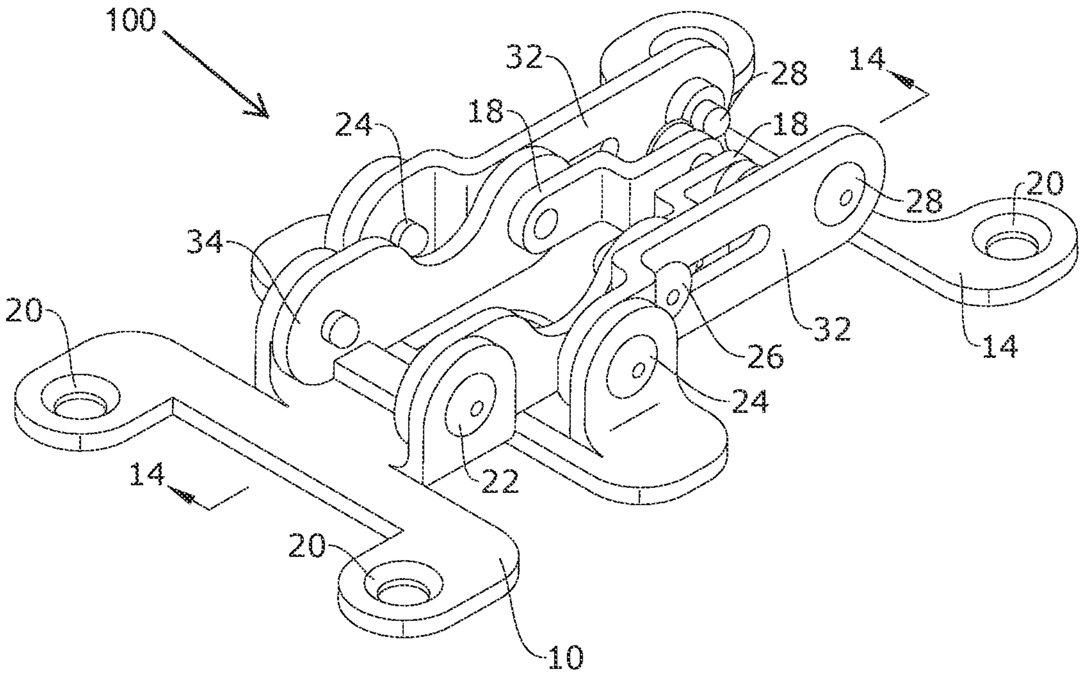
FIG. 11 is a perspective view of an exemplary embodiment of the present invention.
Figure 13:
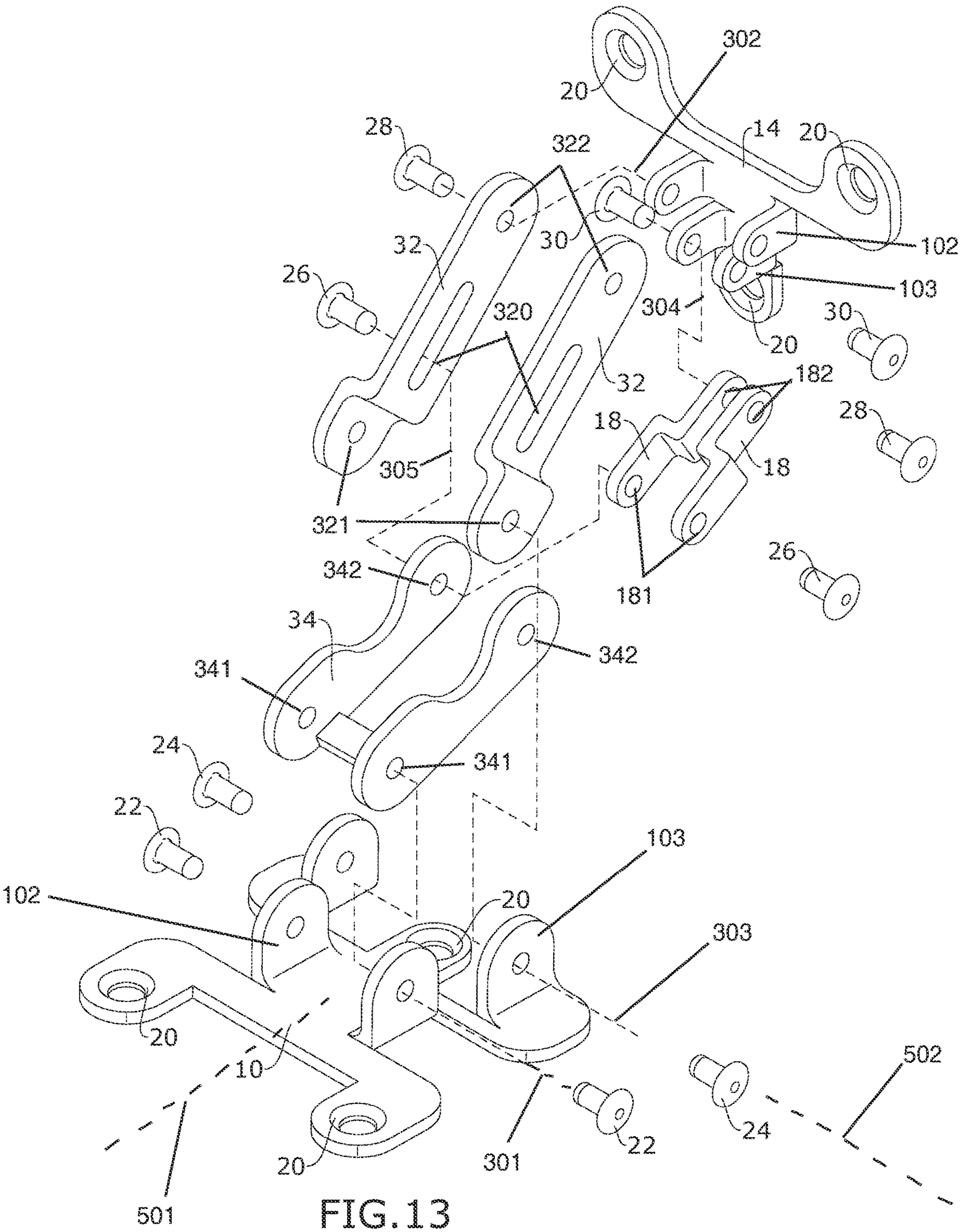
FIG. 13 is an exploded view of an exemplary embodiment of the present invention.
Figure 14:
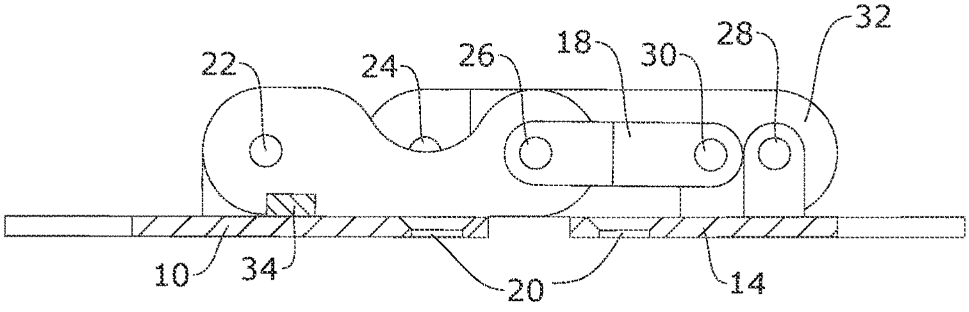
FIG. 14 is a section view of an exemplary embodiment of the present invention, taken along line 14-14 in FIG. 11.
Figure 15:
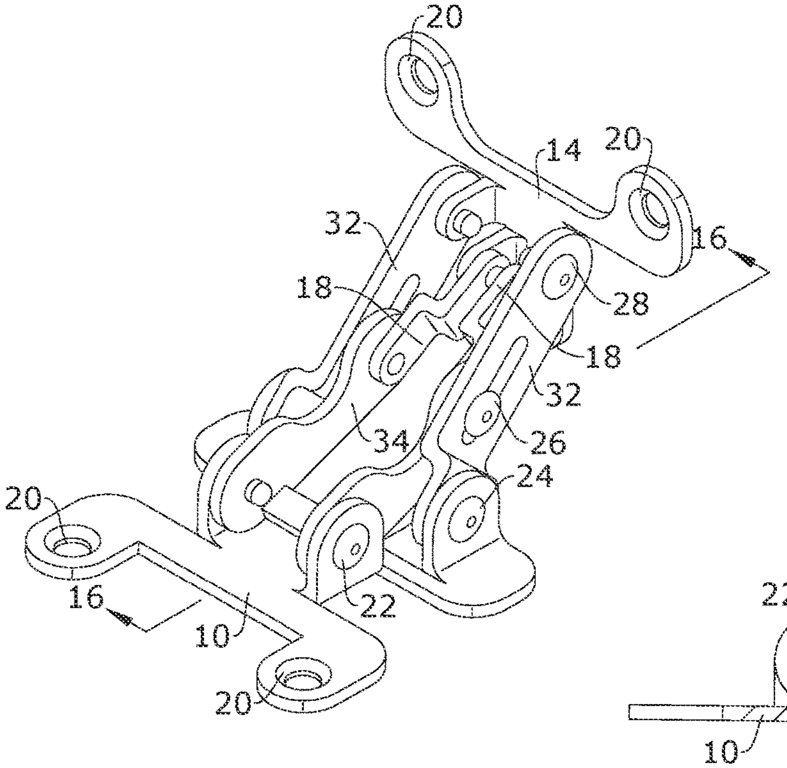
FIG. 15 is a perspective view of an exemplary embodiment of the present invention, showing the hinge at a 90-degree angle.
Figure 16:
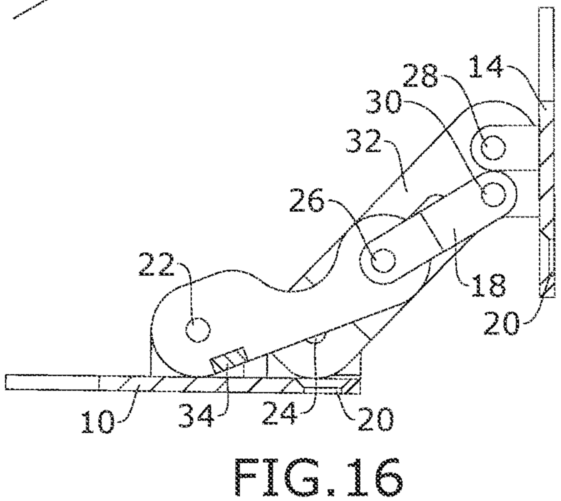
FIG. 16 is a section view of an exemplary embodiment of the present invention, taken along line 16-16 in FIG. 15.
Figure 17:
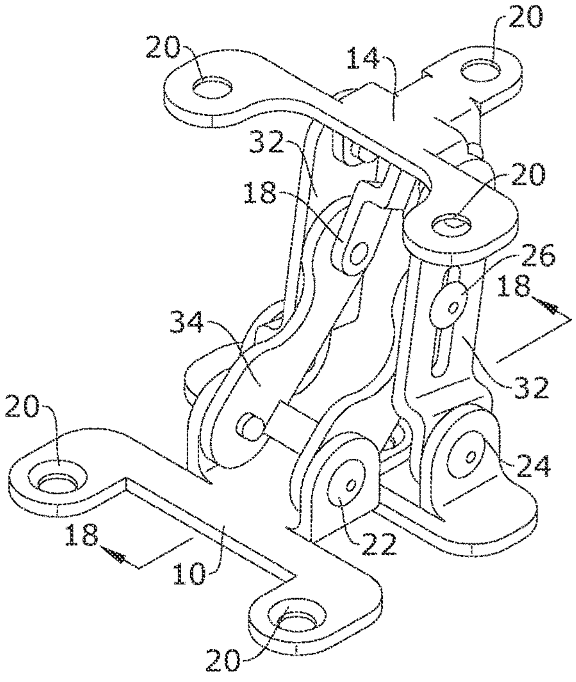
FIG. 17 is a perspective view of an exemplary embodiment of the present invention, showing the hinge at a 180-degree angle.
Figure 18:
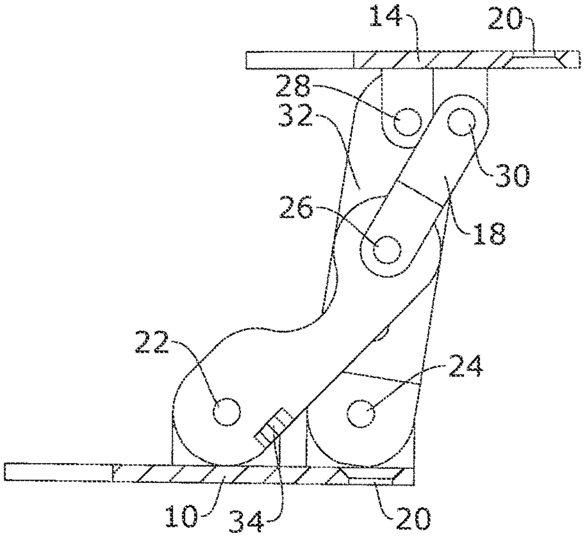
FIG. 18 is a section view of an exemplary embodiment of the present invention, taken along line 18-18 in FIG. 17.
Figure 19:
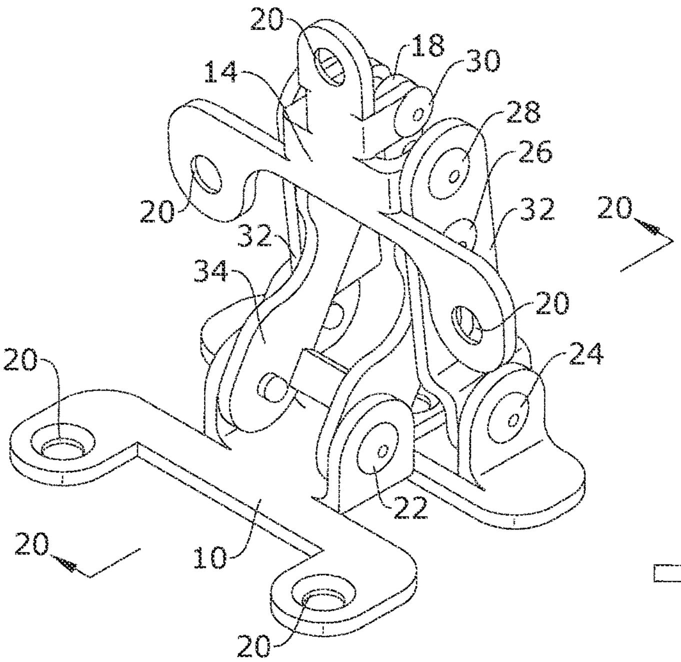
FIG. 19 is a perspective view of an exemplary embodiment of the present invention, showing the hinge at a 270-degree angle.
Figure 20:
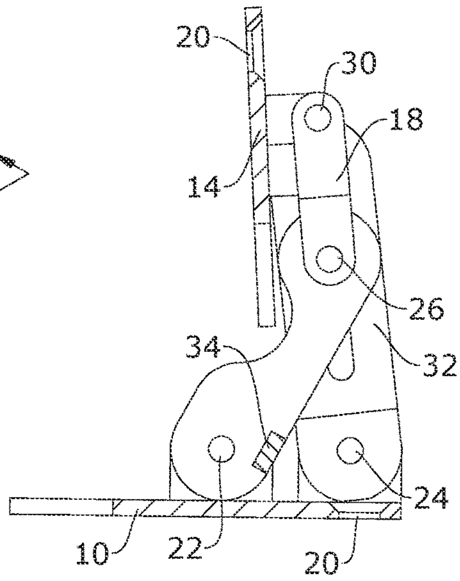
FIG. 20 is a section view of an exemplary embodiment of the present invention, taken along line 20-20 in FIG. 19.

The second connection element 12/32 has a pair of connecting portions 121/321 at a first end and a pair of connecting portions 122/322 at a second end. The pairs of connection portions 121/321 and 122/322 may be offset along the second direction 502. A slidable void or slot 120/320 may extend between each respective connecting portion of the pairs of connection portions 121/321 and 122/322, as illustrated in FIG. 3 and FIG. 13 respectively. Thus, there are a pair of slidable voids 120/320. Each slidable void 120/320 may be linear.

The third connection element 18 has a pair of connecting portions 181 at a first end and a pair of connecting portions 182 at a second end. The pairs of connection portions 181 and 182 may be offset along the second direction 502.

The three connection elements 16/34, 12/32, and 18 connect the two base elements 10 and 14. Specifically, connecting portions 161/341 at the first end of the first connection element 16/34 and first connecting portion 102 of the first base element 10 form a first hinge connection about a first rotational axis 301. Connecting portions 122/322 at the second end of the second connection element 12/32 and the first connecting portion 102 of the second base element 14 form a second hinge connection about a second rotational axis 302. Connecting portions 121/321 at the first end of the second connection element 12/32 and second connecting portion 103 of the first base element 10 form a third hinge connection about a third rotational axis 303. Connecting portions 182 at the second end of the third connection element 18 and second connecting portion 103 of the second base element 14 form a fourth hinge connection about a fourth rotational axis 304.

Connecting portions 162/342 at the second end of the first connection element 16/34 and connecting portions 181 of the third connection element 18 form a fifth hinged connection about a rotational axis 305, wherein the fifth hinge connection rides along the slidable void 120/320 of the second connection element 12/32.

All hinged connections can be either detachable or non-detachable by the way of first through fifth pivot pins 22 through 30, respectively, or the like. The hinged connections between the three connection elements 16/34, 12/32, and 18 and base elements 10 and 14 can be achieved by pin-and-hole fittings. Alternatively, the hinged connections can also be achieved by ball-and-socket fittings or in other possible manners.

Figure 2:
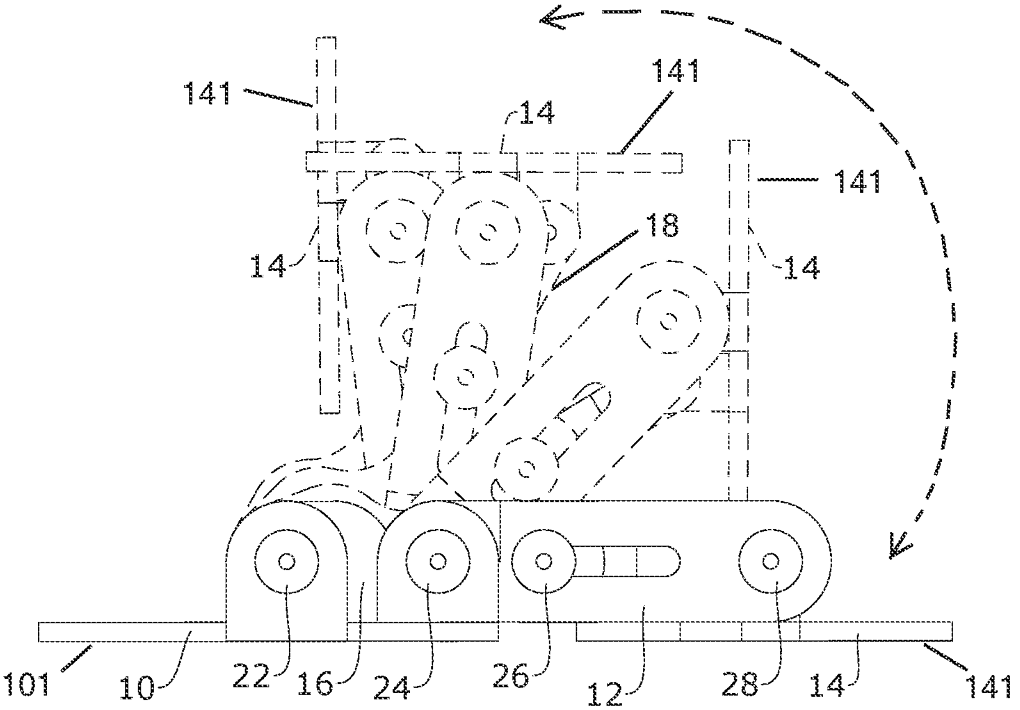
FIG. 2 is a side elevation view of an exemplary embodiment of the present invention, showing the hinge moving through a range of motion.
Figure 12:
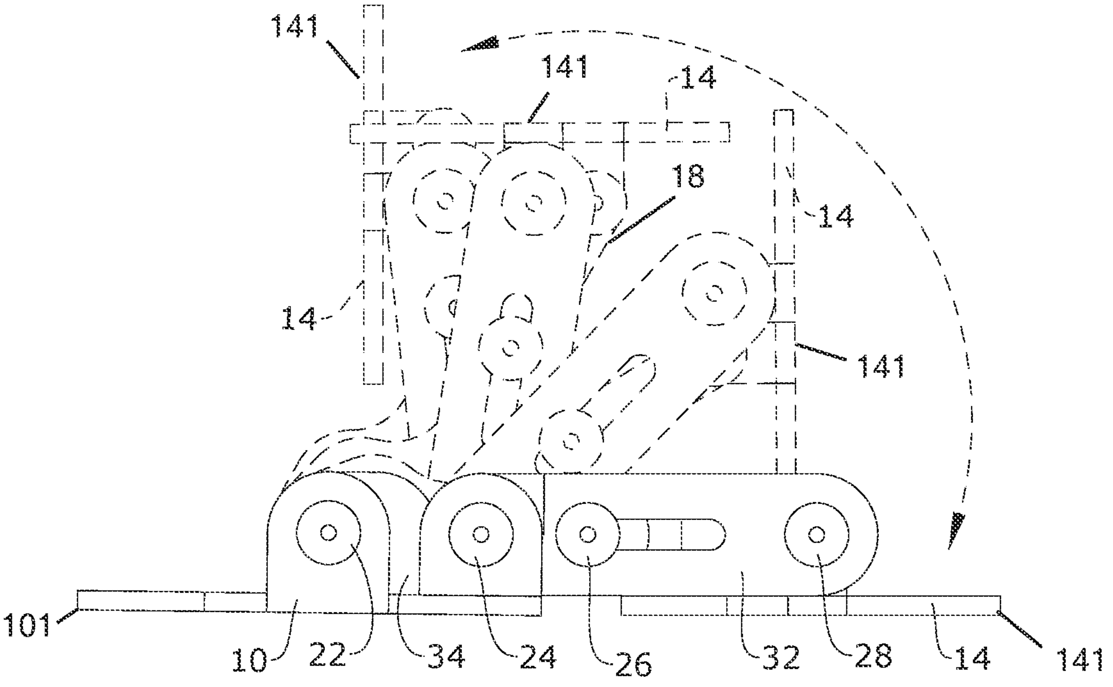
FIG. 12 is a side elevation view of an exemplary embodiment of the present invention, showing the hinge moving through a range of motion.

The hinge assembly 100 according to the present invention is movable between a range of motion that at least includes a first state (FIG. 1 and FIG. 11) and a second state. In the first state, the mounting surfaces 101 and 141 of the first and second base elements 10 and 14, respectively, are coplanar. In the second state, the mounting surfaces 101 and 141 of the first and second base elements 10 and 14 are at 270-degrees relative to each other, as illustrated in FIG. 2 and FIG. 12 as a counterclockwise motion. During the motion between the first and second states, the fifth hinge connection moves from a first end of the slidable voids 120/320 of the second connection element 12/32, to an opposing end thereof. It should be understood that the second base element 14 can also rotate with respect to the first base element 10. For example, when the hinge assembly 100 is in the second combination state, the first base element 10 can be maintained stationary and the second base element 14 is able to rotate clockwise or counterclockwise.

When the hinge assembly 100 moves from the first state to the second state, the first connection element 16 of the first hinge connection rotates approximately less than 90-degrees and the second connection element 12 of the third hinge connection rotates approximately more than 90-degrees, while the third connection element 18 of the second and fourth hinge connections rotate approximately 180-degrees. Accordingly, the mounting surfaces 101 and 141 move from co-planar to 270-degrees relative to each other between the first state and the second state. As used in this application, the term "about" or "approximately" refers to a range of values within plus or minus 10% of the specified number.

It is understood that the base elements and connection elements may be made from any suitable material, including but not limited to steel, brass, aluminum, or even various plasticized materials. The connection elements may or may not have an interconnection between each of its two pair of connection portions. For example, the first connection element 16 (see FIG. 3) may have a body that interconnects both connection portions of the pair of connecting portions 162 of its second end, while in an alternative embodiment (see FIG. 13) the first connection element 34 has no body interconnecting both connection portions of the pair of connecting portions 342.

The movement of the hinge assembly 100 of the present invention may be restricted. When the hinge assembly 100 is in the second state, rotation of the hinge assembly 100 is restricted by the opposing forces vis-à-vis the third and the fifth hinge connections.

It should be understood, of course, that the foregoing relates to exemplary embodiments of the invention and that modifications may be made without departing from the spirit and scope of the invention as set forth in the following claims.

What is claimed is:

1. A hinge assembly, comprising:

a first mounting plate;

a second mounting plate;

a linkage interconnecting the first and second mounting plates so that the first and second mounting plates are pivotable relative to each other by at least 270-degrees;

the linkage comprises a first, a second, and a third connection element, respectively, wherein each connection element has a first end and a second end, and wherein the first end and the second end each have a pair of connection points;

each mounting plate comprises first and second connection portions, wherein the first end of the first and second connection elements define a first pair of hinge connections by engaging the first and second connecting portions of the first mounting plate, respectively, and wherein the second end of the second and third connection elements define a second pair of hinge connections by engaging the first and second connecting portions of the first mounting plate, respectively;

a slidable void extending between the first and the second ends of the second connection element; and the second end of the first connection element and the first end of the third connection element form a ridable fifth hinge connection along said slidable void.

2. The hinge assembly of claim 1, wherein the first and second mounting plates are pivotable relative each other between a first state and a second state, wherein the first state, the first and second mounting plates are coplanar and wherein in the second state, the first and second mounting plates are oriented at least 270-degrees relative to each other.

3. The hinge assembly of claim 2, wherein the first state the ridable fifth hinge connection is at a first end of the slidable void, and wherein the second state the ridable fifth hinge connection is at a second end of the slidable void.

4. The hinge assembly of claim 3, wherein further comprising:

the first connecting portion of the first mounting plate and the first end of the first connection element form a first hinge connection of the first pair of hinge connections.

5. The hinge assembly of claim 4, further comprising:

the first connecting portion of the second mounting plate and the second end of the second connection element form a second hinge connection of the second pair of hinge connections.

6. The hinge assembly of claim 5, further comprising:

the second connecting portion of the first mounting plate and the first end of the second connection element form a third hinge connection of the first pair of hinge connections.

7. The hinge assembly of claim 6, further comprising:

the second connecting portion of the second mounting plate and the second end of the third connection element form a fourth hinge connection of the second pair of hinge connections.

8. The hinge assembly of claim 7, wherein, for each mounting plate, the first and the second connecting portions are offset from each other in at least two directions.

* * * * *